United States Patent [19]

Werner et al.

[11] Patent Number: 5,210,127
[45] Date of Patent: May 11, 1993

[54] FREE-FLOWING, THERMOPLASTICALLY PROCESSIBLE AND POST-CROSSLINKABLE POLYURETHANE POWDERS

[75] Inventors: Joachim Werner, Dormagen; Walter Meckel, Neuss; Ulrich Liman; Dirk Wegener, both of Monheim; Werner Rasshofer, Cologne, all of Fed. Rep. of Germany; James W. Rosthauser, Glen Dale, W. Va.

[73] Assignees: Bayer Aktiengesellschaft, Leverkusen, Fed. Rep. of Germany; Miles Inc., Pittsburgh, Pa.

[21] Appl. No.: 964,592

[22] Filed: Oct. 21, 1992

[30] Foreign Application Priority Data

Oct. 28, 1991 [DE] Fed. Rep. of Germany ....... 4135475
Mar. 25, 1992 [DE] Fed. Rep. of Germany ....... 4209709

[51] Int. Cl.$^5$ ................... C08G 18/81; C08L 75/00; C08J 9/00
[52] U.S. Cl. ................... 524/589; 521/131; 524/590; 524/871; 524/872; 524/873; 524/874; 524/875; 528/45
[58] Field of Search ............ 521/131; 524/589, 590, 524/871, 872, 873, 874, 875; 528/45

[56] References Cited

U.S. PATENT DOCUMENTS

| | | | |
|---|---|---|---|
| 3,933,759 | 1/1976 | Hoeschele | 260/77.5 TB |
| 3,963,710 | 6/1976 | Aufdermarsh, Jr. | 260/247.2 A |
| 4,596,842 | 6/1986 | Chung et al. | 528/45 |
| 4,940,750 | 7/1990 | Rosthauser et al. | 524/871 |
| 4,976,833 | 12/1990 | Delroy et al. | 528/45 |
| 4,985,490 | 1/1991 | Rosthauser et al. | 524/871 |
| 5,049,249 | 9/1991 | Chung et al. | 528/45 |
| 5,077,339 | 12/1991 | Grogler et al. | 528/45 |
| 5,089,645 | 2/1992 | Nichols et al. | 528/45 |

FOREIGN PATENT DOCUMENTS 2017354 11/1990 Canada.
2036125 2/1991 Canada.

*Primary Examiner*—Morton Foelak
*Attorney, Agent, or Firm*—Joseph C. Gil

[57] ABSTRACT

Novel powders useful in the slush molding process are produced by reacting an emulsion of either an isocyanate or an isocyanate reactive material with either an isocyanate reactive material or an isocyanate, depending upon the nature of the component used to make the emulsion in the presence of an at least partially blocked isocyanate and an organic carrier. The final reaction product is subsequently removed from the carrier.

3 Claims, No Drawings

FREE-FLOWING, THERMOPLASTICALLY PROCESSIBLE AND POST-CROSSLINKABLE POLYURETHANE POWDERS

BACKGROUND OF THE INVENTION

The present invention relates to free-flowing, thermoplastically processible and post-crosslinkable polyurethane powders, their production and their use for the production of crosslinked sheets by processing above the melting point via the powder slush molding process.

The invention further relates to expandable polyurethane powders containing blowing agents and to their use for the production of foamed polyurethane moldings.

Powders play an important part in many fields of plastics production and processing. Due to their high degree of dispersion and the flowability associated therewith, they are used, e.g., for the production of adhesives, coatings, thin films and sheets.

The preparation of cellular (or foamed) moldings from microcellular polyurethane elastomers or polyurethane foams is known and has been described in numerous patent and literature publications (see e.g., Kunststoff-Handbuch, volume 7, "Polyurethane", 1st Edition, 1966, 2nd Edition, 1983, Carl Hanser Verlag, Munich, Vienna). ("Polyurethane" will hereinafter be abbreviated to "PU") These moldings are normally produced by introducing pourable or fluid reaction mixtures of organic polyisocyanates and compounds having at least two reactive hydrogen atoms together with liquid blowing agents into molds which are optionally tempered, and then foaming up and curing the mixtures in these molds.

It is known that polyurethane moldings having a compact, substantially non-porous outer skin or surface and a cellular core (PU integral foams) are produced by introducing a larger quantity of foamable reaction mixture into the mold than would be required for completely filling the cavity of the mold with the foamed up mixture without the application of pressure. Foaming is thus carried out inside a closed mold under conditions of compression.

Thin panels or films of PU foam produced in large PU foam blocks or by bonding PU foam waste under pressure are used for numerous applications, e.g. for soundproofing in the engine compartment of motor vehicles. It would be desirable to be able to produce the foam parts in the desired form in as few working steps as possible but the foaming and curing process of the usual liquid reactive systems for such small foam parts is difficult to carry out.

The use of decorative plastic sheets in motor vehicle passenger compartments is known. [R. Pfriender, Kunststoffe, 76 (1986), 10, p. 960 ff]. According to the prior art in this connection, PVC/ABS sheets formed by the thermoform process are usually used and are then back-foamed. Polyurethane sheets produced from liquid systems can be processed by the IMC (in-mold coating) process. The production of components, however, is very expensive and difficult to control (M. Wachsmann, Kunststoffberater 10/1987, pp. 27–28).

On the other hand, the powder slush molding process permits the production of sheets that are considerably finer-structured and undercut and accordingly of higher quality. Here, according to the prior art, PVC powder is used which is gelled at about 250° C. by rotating in the heated mold. After cooling the mold, the sheet can be withdrawn. Here again, however, it is necessary to transfer the resulting film into another mold. In other words, back-foaming must be carried out in a second mold.

For the PVC sheets, which are usually back-foamed with polyurethane foams, there is a mutually negative effect between the PVC sheet and of the PU foam. Catalysts or stabilizers can diffuse out of the PU foam into the PVC skin. There is simultaneously a migration of e.g. plasticizers in the reverse direction. These processes may cause mechanical damage or discoloration to the molded products, e.g. the products may become brittle. These damaging interactions can be avoided by using PU powders for producing the covering layers and back-forming them with PU foam. This has the added advantage of producing a uniform synthetic resin bond which can more easily be worked up again. It would be advantageous to provide a simpler process than that of the state of the art so that the skin produced could be directly back-foamed in the same mold in which it was produced.

From the viewpoint of reworkability, moreover, composite systems of a uniform type of plastic are desirable. Accordingly there is a strong interest from the automobile industry in uniform materials in which the aforementioned negative interactions between skin and back-foaming do not occur and the possibility of simpler recycling exists. The use of PU cover sheets that are back-foamed with PU therefore suggests itself.

It is known to granulate and grind thermoplastic polyurethanes (TPU) that are obtained by extrusion or ribbon processes to obtain PU powders [German Offenlegungsschriften 3,916,874 (believed to correspond to Canadian patent 2,017,354) and 4,006,648]. The resultant granulate can be processed by sintering to sheets. This procedure is disadvantageous due to the expensive grinding process required. Due to the toughness of the materials used, the system must also be strongly cooled, e.g. with liquid nitrogen, during grinding. In addition, expensive devices for avoiding dust are required. Moreover the irregular shape of the material being ground can cause problems with the flowability of the powder.

The possibility of producing cellular PU moldings, preferably PU sheets, from a mixture of the resulting TPU powders with a blowing agent which is solid at 23° C. by sintering the mixture has also been described. These PU powder mixtures containing blowing agent may be used, for example, in the above-mentioned powder slush process for back-foaming the previously produced skin without having to change the mold (see, e.g., German Auslegeschriften 4,006,648).

This procedure, i.e. the use of TPU produced by extrusion or laminator processes, is disadvantageous due to the subsequent grinding process necessary for producing the powder. Due to the toughness of the materials used, grinding must be accompanied by vigorous cooling, e.g. with liquid nitrogen. In addition, expensive apparatus are required for preventing the formation of dust. Further, the irregular form of the grinding stock may cause problems in the flowability of the powder. Due to the high temperatures of the extrusion or laminator process, preparation of the TPU powder mixture containing blowing agent must be carried out by subsequently mixing the powder with the blowing agent which is solid at 23° C. and also pulverulent, so that an additional, expensive processing step is required.

The use of thermoplastic PU systems permits the sintering of powders with flow of the melt to a homogeneous skin. But with pure thermoplastic (linear) systems, the low-viscosity TPU melt flows downwards or away on vertical mold surfaces or at overheated points of the mold, so that the thickness of the skin can become non-uniform. Holes can even appear in the sheet.

Thermoplastic processing requires a system that initially is substantially linear. Crosslinking occurring during processing is disadvantageous due to the resulting increase of viscosity.

It is known to react isocyanates with monofunctional reactants ("blocking agents") such as, e.g. oximes, caprolactam or phenol derivatives to form thermolabile adducts. These "capped" or "blocked" isocyanates can be used to prepare systems which are thermoplastic up to the breakdown temperature of the adducts and which crosslink above this temperature.

Furthermore, the use of uretdiones or polyisocyanates containing uretdione groups in one-component PUR reactive systems is known. The polyisocyanates containing uretdione groups are obtained by bringing two isocyanates together (i.e., "dimerizing") in presence of special catalysts. The uretdione groups split at elevated temperature and react further, e.g., in presence of hydroxy groups with crosslinking. This occurs without release of any "capping" or "blocking" agent. The production of such one-component PUR systems containing capped isocyanates by the conventional extrusion or ribbon process in the melt, as described e.g. in the German Offenlegungsschrift 3,916,874, is basically problematic, since the cleavage temperature can be reached or exceeded and the system crosslinks even during its production. In addition, the product must then be ground to powder in a way that is costly and difficult.

On the other hand, the direct production of PU powders by polyaddition in emulsion is a process that provides free-flowing powders directly and at relatively moderate reaction temperatures (see, e.g., U.S. Pat. No. 4,985,490 and European patent 394,789). The direct production of pulverulent thermoplastic polyurethanes by reaction of polyester or polyether polyols and low-molecular diols with polyisocyanates in an inert solvent in presence of emulsifiers is known.

It is also known is to directly produce pulverulent, completely blocked isocyanates by reaction of polyisocyanates with NCO-reactive compounds (German Offenlegungsschrift 2,536,976, believed to correspond to U.S. Pat. No. 3,963,710). It is also known to produce two-component thermally activable powders (a powder mixture of two powders of different chemical composition) in which one kind of particle has isocyanate groups blocked with NCO-reactive compounds (German Offenlegungsschrift 2,556,945, believed to correspond to U.S. Pat. No. 3,933,759). The complete blocking of the NCO groups in the powder leads to too rapid a build-up of viscosity during the crosslinking. The production of two-component powders via a mixing process leads to inhomogeneities which have an adverse effect on the reaction product.

The possibility of using blocked isocyanates in the production of PU powders in a continuous process has been suggested (European patent 394,789, believed to correspond to U.S. Pat. No. 4,940,750). Specific advantages relating to the use of the blocked NCO groups, i.e. the advantageous melt behavior, in the powder slush molding process, were not suggested or recognized.

It was an object of the present invention to develop a PU powder suitable for use in the slush molding process, that was free-flowing, that at first melts like a thermoplastic and then advantageously progressively crosslinks, which does not have the risk of pre-crosslinking under production conditions and furthermore avoids any solid mixing processes.

It was a further object of the invention to provide suitable pulverulent, fusible polyurethane systems not requiring a difficult grinding process or subsequent mixing with blowing agents for the production of cellular PU moldings in relatively thin layers or the backfoaming of compact films.

DESCRIPTION OF THE INVENTION

It has now been found that free-flowing polyurethane powders, at first melting like a thermoplastic and then advantageously progressively crosslinking, can be readily and easily produced. More particularly, the present is directed to a process comprising a) producing an emulsion of fine droplets of a first component, stabilized by a surface-active compound, wherein said first component is selected from the group consisting of IA) a component having free NCO groups and IB) a component IB having groups reactive towards NCO groups, b) reacting said emulsion with a second component reactive with said first component, said second component selected from the group consisting of IIA) a component having an average of two hydrogen atoms reactive towards NCO groups per molecule and IIB) a component having an average of two NCO groups per molecule, with the proviso that if the emulsion of step a) is based upon component IA), the said second component is IIA) and if the emulsion of step a) is based upon component IB), then said second component is IIB), wherein step b) is conducted in the presence of a separately produced component III that contains at least partially blocked isocyanate groups, and in the presence of an inert organic liquid carrier phase in which the components IA or IB and the respective reaction product with components II and III are insoluble, and c) separating the reaction product from said inert organic carrier.

Preferably the continuous phase of the emulsion of step a) is at the same time the inert organic liquid carrier phase.

"Insoluble" in the sense of this invention includes the term "immiscible" so far as this relates to liquid droplets.

The reaction product is obtained in the form of spherical particles whose size corresponds to that of the fine droplets of component IA or IB and which are protected from agglomeration by the surface-active compound, so that free flowability is assured even after removal of the organic carrier phase.

According to the invention the preferred process is the embodiment in which the component I forming the disperse phase of the emulsion has free NCO groups (IA) and the step b) reaction takes place with a component II that has on average two hydrogen atoms reactive towards NCO groups (IIA).

Component IA is preferably an NCO prepolymer that is produced either separately or in the organic carrier phase by reaction of a compound reactive towards NCO groups with a polyisocyanate.

Useful polyisocyanates for use in preparing such prepolymers or for use as component IA or component IIB include aromatic, aliphatic or cycloaliphatic diisocyanates or mixtures thereof. In addition, care should be taken that these diisocyanates are either liquid or can be emulsified in liquid form in the carrier phase at the reaction temperatures or at least that the NCO prepolymer formed is emulsifiable in liquid form. There may be mentioned for example as aromatic diisocyanates tolylene diisocyanate (2,4- and 2,6-isomers or mixtures thereof), diphenylmethane diisocyanate (4,4'- and 2,4'-isomers or mixtures thereof), 1,4-phenylene diisocyanate and 1,5-naphthalene diisocyanate (less preferred due to its high melting point); as aliphatic diisocyanates hexamethylene-1,6-diisocyanate, xylylene diisocyanate and 1,12-dodecane diisocyanate; and as cycloaliphatic diisocyanates 4,4'-methylene-bis(cyclohexyl diisocyanate), 1,4-cyclohexylene diisocyanate and isophorone diisocyanate.

Aliphatic or cycloaliphatic diisocyanates such as 1,6-hexamethylene diisocyanate or 4,4'-methylenebis(cyclohexyl isocyanate) are preferred if products not discoloring in the light are required.

One of the polyisocyanates mentioned or a mixture of several of these polyisocyanates is preferably used as component IIB.

Preferably used as component IB or as compounds reactive towards isocyanate in the production of the NCO prepolymer (which is preferably used as component IA) are high-molecular diols having an average of two hydroxyl groups and average molecular weights of about 400 to 6000. These include, for example, hydroxyfunctional polyesters, polycarbonates, polyester carbonates, polyethers, polyether carbonates, polyacetals, polyacrylates, polybutadienes, polyester amides or polythioethers. Amino-functional polyethers (U.S. Pat. No. 4,724,252, and German Offenlegungsschrift 3,713,858) also can be used. While it is preferred to use compounds having an average of two reactive groups per colecule, it is possible to use higher-functional compounds. If such higher-functional materials are used, the thermoplasticity of the PU powder will be assured by admixture of monofunctional reactants such that the average functionality is two.

Suitable polyethers are e.g. those that are obtained by ring-opening polymerization of propylene oxide or ethylene oxide in presence of one or several compounds with active hydrogen or by ring-opening polymerization of tetrahydrofuran.

If light-stable products are required, preferably polyesters, polycarbonates or polyester carbonates are used. Suitable polyester polyols can be obtained e.g. by condensation of one or several dicarboxylic acids, their anhydrides or diesters by reaction with one or several low-molecular glycols. Suitable dicarboxylic acids are, e.g., succinic acid, adipic acid, suberic acid, aromatic dicarboxylic acids such as, e.g., phthalic acid, isophthalic acid or terephthalic acid or the corresponding partially- or perhydrogenated types. Suitable low-molecular glycols are, e.g., ethylene glycol, 1,2- or 1,3-propylene glycol, 1,4- or 2,3-butanediol, neopentyl glycol, 1,6-hexanediol, 1,8-octanediol, cyclohexanedimethanol, diethylene glycol or dipropylene glycol. Polyesters that are obtained by polymerization of lactones such as e.g., ε caprolactone are likewise suitable. Suitable aliphatic hydroxyfunctional polycarbonates can be obtained, e.g., by reaction of the aforesaid low-molecular glycols with diaryl carbonates or cyclic carbonates such as propylene carbonate.

The aforesaid high-molecular glycols or aminopolyethers are also suitable as component IIA according to the invention. But compounds reactive towards NCO groups that have molecular weights below 400 are preferably used as component IIA (e.g., the low-molecular glycols mentioned in connection with the aliphatic polyesters). Also suitable are aminoalcohols such as e.g. N-methyldiethanolamine or aminoethanol and diamines such as e.g. ethylenediamine, 1,6-diaminohexane or piperazines. Hydrazines, hydrazides and semicarbazides are likewise suitable. Also suitable as components IB or IIA are mixtures of the high- and low-molecular diols mentioned. The low-molecular glycols are preferred as component IIA in the production of the PU powders according to the invention.

The component III used according to the invention is a reaction product that is separately produced and mixed or coemulsified with one of the components IA or IIB, or, if component III no longer has free NCO groups, with IB or IIA. It is preferred to mix or coemulsify component III with component IA.

The component III is an isocyanate where at least a portion of the isocyanate groups are blocked. The component can contain blocked NCO groups that are inert under the conditions of production of the PU powder towards groups reacting with NCO groups, and therefore is outwardly NCO-free. Alternatively, it can be partly blocked and contain NCO groups that are reactive towards NCO-reactive groups. In this case, it must contain free NCO groups, on an average of no more than two reactive NCO groups per molecule, so that it can be incorporated without pre-crosslinking in the powder. Finally the component III used can also be a mixture of two such reaction products.

Component III can be obtained, e.g., by partly or completely reacting a polyisocyanate with a blocking agent or with a blocking agent and a further NCO-reactive compound, e.g. a polyol. Moreover, the resultant component must be either homogeneously miscible or coemulsifiable with the component with which it is mixed or coemulsified. Advantageously, it should be liquid or fusible at the temperatures used.

Suitable polyisocyanates for reaction with a blocking agent and/or a further compound reactive towards NCO groups are, e.g., the diisocyanates previously noted. Advantageously, however, polyisocyanates with higher functionality are used. Thus, for example, the crosslinking isocyanates known in the lacquer and coatings industry, such as polymers of diphenylmethane diisocyanate, biurets, trimethylolpropane adducts or trimers (isocyanurates) of the aforesaid diisocyanates are used as component III.

To adjust a specific melting behavior and to increase the compatibility with the particular component with which component III is mixed or coemulsified, a further compound reactive towards NCO groups may be reacted with the blocked polyisocyanate. In this connection, the high-molecular glycols noted earlier are preferably used. If a higher-functional isocyanate is used, the ratio of glycol to blocking agent must be so chosen that no premature crosslinking ("gelling") of the component III occurs.

The blocking agents used can be, e.g., oximes (preferably butanone oxime), lactams (preferably ε caprolactam), acetoacetic acid esters (preferably ethyl acetoacetate), malonic acid esters (preferably diethyl malonate)

or substituted phenols (preferably p-hydroxybenzoic acid esters such as, e.g., p-hydroxybenzoic acid ethyl ester). The p-hydroxybenzoic acid esters have low cleavage temperatures (even below 150° C.), and the ester split off has a low volatility and has no odor.

In a preferred embodiment of the present invention, the component III used is obtained by partly blocking the trimer (isocyanurate) of 1,6-hexamethylene diisocyanate with a p-hydroxybenzoic acid ester and reacting the remainder of the NCO groups with a hydroxyfunctional polyester, especially a polyadipate with a melting range not exceeding 100° C.

Compounds suitable as blocked isocyanates also include 1,3-bis[isocyanato-organo]-2,4-dioxo-1,3-diazetidine or 3,5-bis[isocyanato-organo]-2,4,6-trioxotetrahydro-1,3,5-oxadiazines, such as e.g. the adduct of 2 moles 1,6-hexamethylene diisocyanate and 1 mole carbon dioxide.

In a further preferred embodiment of the present invention, a further polyisocyanate adducts that on heating regenerate NCO functionality without a "splitter" being released can be used as a constituent of the component III. Here the so-called isocyanate dimers or uretdiones mentioned earlier may be named. Examples of useful dimers include those of tolylene diisocyanate, of diphenylmethane diisocyanate, of isophorone diisocyanate and of 1,6-hexamethylene diisocyanate as well as mixtures of such dimers. The isocyanates containing uretdione groups can be applied as such or they can be mixed with other polyisocyanates. For example, to reduce the functionality by on average more than two free NCO groups in the molecule, they can be reacted as such or mixed with other polyisocyanates and then reacted with monofunctional compounds reactive towards NCO groups, such as e.g. alcohols. The resultant products can used as the component III and will contain free NCO groups. They also can be reacted as such or mixed with other polyisocyanates and then reacted with a mixture of a high-molecular glycols and, for adjustment of the functionality, a monofunctional compound reactive towards NCO groups. They can also be used alone or mixed with other polyisocyanates using blocking agents as described further back.

If products not discoloring under the influence of light are required, the uretdiones of aliphatic and cycloaliphatic diisocyanates are preferred. Thus in a preferred embodiment of the present invention, the dimer of 1,6-hexamethylene diisocyanate, which still contains small amounts of trimer (isocyanurate), is reacted to adjust the functionality with a monofunctional alcohol, preferably n-butanol, n-octanol or n-dodecanol, so that there remain on average about two NCO groups per molecule. The products are either advantageously liquid at room temperature or can easily be fused at slightly elevated temperatures and can be used as component III.

Components III which use an external blocking agent, such as, e.g., p-hydroxybenzoic acid ester, make it possible to produce free-flowing, thermoplastically processible and in addition rapidly post-crosslinking powders.

The use of the polyisocyanates containing the uretdione groups without further use of a blocking agent makes it possible to produce splitter-free, thermoplastically processible and in addition post-crosslinking polyurethane powders.

The proportion of component III used is limited on the one hand by the requirement for sufficiently effective crosslinking that provides for a rise in viscosity during the processing and on the other hand by the risk of excessive crosslinking, which is shown by the powder's no longer fusing and flowing well. Component III is preferably applied in such an amount that the calculated maximum proportion of NCO groups arising by deblocking or cleavage, relative to the total number of the free and blocked NCO groups, is about 1 to 20%, more preferably at least 3%, and most preferably between 3.5 and 12%.

The total number of NCO groups (blocked and unblocked) in the PU powder according to the invention must be about equal to the total number of groups reactive towards NCO groups, excluding, if the occasion arises, those groups reactive towards NCO groups contributed by the splitters. The NCO groups released during the processing of the powder ideally react with the part of the groups reactive towards NCO groups that remains as a result of addition of components IB or IIA after reaction with component IA or IIB. Accordingly the proportion of the components IB or IIA must be approximately so chosen that after reaction with the free NCO groups of components IA, IIB or III an excess of groups reactive towards NCO groups remains that approximately corresponds to the number of blocked NCO groups of component III. The melting behavior of the powder and also the post-crosslinking can be influenced by a small excess of deficiency of blocked NCO groups, so that it can be advantageous to control such an excess or deficiency deliberately. According to the invention, the ratio of NCO groups of components III and IA or IIB to NCO reactive groups of components IB, or IIA, is preferably between 0,7 and 1,2, most preferably between 0,8 and 1,1. During the production of the powder, the individual components are preferably so coordinated that the powder remains thermoplastically processible and preferably melts in the range from 150° to 200° C.

Liquids that are suitable as the liquid organic carrier phase are unreactive with the reactants, e.g. with groups containing NCO or active hydrogen. In addition, at least the components IA or IB and the respective reaction product with components II and III must be immiscible and insoluble therein. Preferred liquids do not lead to swelling of the PU powder. It is also desirable that the liquid be sufficiently volatile that residues can easily be separated from the powder and that the boiling point be above the reaction temperature. While liquids with lower boiling point can also be used, this will require use of pressure vessels to reach the desired reaction temperature. Liquids that are difficult to remove from the product because of the boiling point or for other reasons can be removed by washing or extraction with other, more volatile liquids that do not harm the product. The upper limit of the suitable boiling range of the liquids is set by the tendency of the blocked isocyanate groups in the PU powder to cleave again. Accordingly, useful organic liquids will generally have boiling points or boiling ranges between about 40° to 200° C., such as, e.g., hydrocarbons, halogenated hydrocarbons and ethers. Liquid hydrocarbons, preferably aliphatic hydrocarbons, e.g. petroleum fractions, are especially suitable due to their low costs, their inertness towards the reactants and the ease and completeness of their removal from the reaction product. The inert organic carrier phase is used in a proportion of from about 20 to 99%, preferably from 40 to 90%, and especially from 50 to 80%, relative to the total weight of components I, II, and III.

The materials used as surface active compounds are preferably nonionic polymeric materials with a molecular weight exceeding 1000 that contain non-polar groups (e.g. hydrocarbon residues) and highly polar groups (e.g. amide, ester or carbonyl groups). The ureathaneacrylate copolymers described in German Auslegungsschrift 3,928,150 are suitable. Preferred materials are copolymers of N-vinyl-2-pyrrolidone (NVP) with an $\alpha$ olefin with 4 to 20 carbon atoms that contain alkyl side chains of 2 to 18 carbon atoms and in which the proportion of the alkylated olefin is in the range of about 10 to 80% at a molecular weight of more than 1000, preferably above 4000. In general about 0.5 to 10% of the surface-active compound, relative to the total weight of the reactants, is used.

Catalysts of the type generally known in PU chemistry that accelerate the reaction of isocyanate groups with compounds containing active hydrogen, can be used for production of the power according to the invention. If a reaction with the isocyanate used is necessary for production of the component III, the catalysts can be used for this reaction. If separate production of the component IA is necessary, catalysts can also be used for its production. Catalysts can also be used in the reaction of the emulsion of the mixture of components IA or IB with component III, with the preferred catalysts dissolving well in the organic carrier phase.

Suitable catalysts include, e.g., tertiary amines (such as e.g. triethylenediamine), and mercury, lead and bismuth catalysts. Tin catalysts such as tin octanoate and dibutyl tin laurate or alkyl esters of diorganotin dimercaptocarboxylic acids are preferred. When used, the catalysts are used in amounts up to 10%, relative to the total weight of the reactants.

During preparation of the powder of the invention, formation of the emulsion of components IA or IB is preferably carried out by means of agitation, e.g. with stirring or mixing devices, and with the aid of the surface-active compound.

For preparation of a preferred powder of the invention, a component IB in the form of a mixture of high- and low-molecular glycol (OH component) with addition of component III (in an embodiment without free NCO groups) is emulsified by means of the surface-active compound into the liquid carrier phase. In addition, the conduct of the reaction (temperature, catalyst addition) must ensure that no prior reaction of the capped or blocked NCO groups of component III with component IB occurs. Afterwards there follows, with addition of component IIB (for example an aliphatic diisocyanate), the conversion to the PU powder. Alternatively the components IIB and III (the latter with or without free NCO groups) can be added successively or as a mixture to the emulsified component IB.

In a preferred embodiment of the invention, an NCO prepolymer is separately produced as component IA and afterwards is emulsified as a melt in the inert organic carrier phase with the aid of a surface active compound. Alternatively the precursors for the production of this prepolymer (i.e., for example, an aliphatic hydroxy-functional polyester and an aliphatic isocyanate) can be reacted in already emulsified or dissolved form in the inert organic carrier phase with formation of an emulsion of component IA. The separately produced component III, containing blocked NCO groups, is either (preferably) mixed with the melt of the separately produced component IA or coemulsified (as melt or liquid) with component IA in the inert organic carrier phase. The required amount of component IIA is added, whereupon the reaction by which the powder according to the invention is formed is allowed to proceed essentially to completion. The reaction time can be adjusted by the amount of catalyst and the temperature.

The separation of the powder from the carrier phase can be carried out, e.g., by filtration followed by drying below the de-blocking temperature of the blocked isocyanates used and below the melting point of the powder.

After separation of the powder, the carrier phase can advantageously be re-used if the preferred catalysts and emulsifiers, that have a good solubility in the carrier phase, such as the aforementioned NVP-olefin copolymers, are used. These remain practically entirely in the filtrate.

Additives, e.g., finely-divided solids such as talcs or vapor-phase silicic acids for improving the flow properties of the powder or of the melt, can be added to the powder either during any stage before the filtration or subsequently. This applies also to other additives such as e.g. pigments, antioxidants, UV stabilizers, flow improvers and the like. In a preferred embodiment of the present invention, the additives are added to one of the liquid starting materials or to one present as a melt, preferably to components IA or IB or to one of their starting materials.

The powder is obtained in the form of spherical particles with diameters between about 10 and 500$\mu$. The nature and amount of the surface-active agent as well as both the intensity of the stirring and the temperature during the reaction affect the size distribution. Because of its finely-divided form, the powder according to the invention is suitable for very different painting or coating processes such as e.g. fluidized bed coating or electrostatic spraying processes as well as for application as a hot-melt adhesive.

The powder of the invention can be used especially advantageously for processes in which a homogeneous coating is obtained on preheated moldings by melting the powder and after cooling the workpiece is withdrawn again as a "skin". Such a process is known as the powder slush molding process. It has been found that by varying the amount and nature of the starting materials, the powders of the invention can be processed even at advantageously low molding temperatures of above 160° C. The proportion of blocked NCO groups being liberated in the processing leads to a viscosity increase of the melt of the powder. This advantageously leads to the fact that when overheated or on vertical molding walls the melt does not, like purely thermoplastic and non-post-crosslinking powders, flow off and no drip points or holes are formed. This melting behavior can be adjusted by the proportion of blocked NCO groups and/or the NCO index of the powder. The controlled incorporation of the blocked NCO groups can advantageously be simply brought about by the previously produced and easily chargeable component III.

The present invention also relates to expandable polyurethane powder preparations containing blowing agent, which consist of the polyurethane powders according to the invention and a pulverulent blowing agent which is solid at least at room temperature (25° C.).

The polyurethane powder preparation according to the invention containing blowing agent may advantageously be used for the preparation of cross-linked, foamed polyurethane moldings by sintering at elevated temperatures in a mold in which the powder is melted and expansion takes place due to thermal decomposition of the blowing agent.

In a preferred embodiment of the powder preparation according to the invention containing blowing agent, the blowing agent may already be added during preparation of the powder, e.g. to the emulsion of component IA or IB. Subsequent mixing of polyurethane powder with blowing agent and its attendant problems (formation of dust) then becomes unnecessary.

Pulverulent blowing agents having an average particle size of about 1 to about 300 μm, preferably up to 30 μm, which are solid at room temperature (25° C.) and can preferably be mixed homogeneously with the polyurethane powder are used for preparing the polyurethane powder containing blowing agent. The particle size influences the decomposition temperature and speed.

Chemical compounds which decompose within a particular, as far as possible narrow temperature range with copious evolution of gas are preferably used. The decomposition temperature must be adjusted to the processing temperature and the thermal resistance of the polyurethane systems used according to the invention. If the blowing agent is already added in the course of preparation of the polyurethane powders before their separation from the carrier phase, it should not undergo any reaction with the raw materials which could interfere with formation of the powder and it should not dissolve in the carrier phase. In addition, the decomposition products produced from the thermal decomposition should not be harmful to health and should not deleteriously affect the thermostability and mechanical properties of the foamed polyurethane moldings. They also should not cause bleeding or discoloration of the products.

Examples of solid blowing agents which fulfill these requirements at least in part include azo compounds such as azoisobutyric acid nitrile, azodicarbonamide (also known as azo-bis-formamide) or barium azodicarboxylate, substituted hydrazines such as diphenylsulphone3,3'disulphohydrazide, 4,4'-oxy-bis-(sulphohydrazide), trihydrazinotriazine or arylbis(sulphohydrazide), semicarbazides such as p-toluenesulphonyl semicarbazide or 4,4'-oxy-bis-(benzene sulphohydrazide), triazoles such as 5-morpholyl-1,2,3,4-thiatriazole and N-nitroso compounds such as N,N'-dinitrosopentamethylenetriamine or N,N-dimethyl-N,N'-dinitrosoterephthalamide, benzoxazines such as isatoic acid anhydride and blowing agent compositions such as mixtures of sodium bicarbonte and citric acid. Among these compounds, the azo compounds and hydrazines have proven particularly useful. The solid blowing agents may be used as individual compounds or as mixtures. Azodicarbonamide, which is obtainable commercially in various specified average particle sizes, is particularly preferred for the preparation of the polyurethane powder composition containing blowing agent.

For the preparation of the polyurethane powder composition containing blowing agent, the solid, pulverulent blowing agent may be homogeneously mixed with the dried powder, normally at temperatures below 80° C., e.g. after separation of the powder from the inert organic carrier phase. Alternatively, the blowing agent may advantageously be added before separation of the organic carrier phase in the course of preparation of the polyurethane powder so that formation of dust in such a mixing process is avoided.

The polyurethane powder containing blowing agent may be prepared by, for example, emulsifying a component IB in the form of a mixture of a high and low molecular weight glycol (OH component) in the liquid carrier phase with the aid of the surface active compound and with the addition of component III (in one embodiment, without free isocyanate groups). The reaction conditions (temperature, addition of catalyst) must be chosen to ensure that no premature reaction of the masked or blocked isocyanate groups of the added component III takes place with component IB. The reaction to form the PU powder then takes place with the addition of component IIB. Alternatively, components IIB and optionally III (the latter with or without free isocyanate groups) may be added to the emulsified component IB either successively or as a mixture. After termination of the reaction, the solid, pulverulent blowing agent may be mixed with the resulting suspension, e.g. by intensive stirring, before separation of the powder from the carrier phase. The resulting polyurethane powder preparation containing blowing agent may then be separated from the carrier phase.

In a preferred embodiment of the invention the solid, pulverulent blowing agent is added to component IA or IB or a precursor thereof and is coemulsified therewith. By this method, the blowing agent is incorporated in the droplets of the emulsion and subsequently in the solid particles of the polyurethane powder preparation. This is obviously an advantage since it to a large extent prevents the formation of dust by added blowing agent.

Thus, for example, a solvent-free isocyanate prepolymer melt may be prepared separately as component IA at a temperature distinctly below the decomposition temperature of the blowing agent, and the solid blowing agent may already be added at this stage. The melt containing blowing agent is then emulsified in the inert organic carrier phase by means of a surface-active compound. Alternatively the blowing agent may be incorporated in the precursors for the preparation of this prepolymer, for example in an aliphatic hydroxy functional polyester and an aliphatic isocyanate, and the precursors may be reacted in the inert organic carrier phase to form an emulsion of component IA. The optionally used separately prepared component III containing blocked isocyanate groups may either be mixed with the melt of the separately prepared component IA, as is preferred, or co-emulsified (as melt or liquid) with component IA in the inert organic carrier phase. The required quantity of component IIA is added and the reaction, in which a suspension of the polyurethane powder preparation containing blowing agent is formed, is continued until virtually complete. The reaction time may be adjusted by the quantity of catalyst and the temperature but the temperature is limited upwardly by the decomposition temperature of the blowing agent and the temperature at which any blocked isocyanates used are released. Separation of the polyurethane powder preparation containing blowing agent from the carrier phase may be carried out e.g. by filtration followed by drying at a temperature below the unblocking temperature of the blocked isocyanates optionally used and the decomposition temperature of the blowing agent and below the melting point of the powder.

The carrier phase may advantageously be used again after removal from the powder if the preferred catalysts and emulsifiers which are readily soluble in the carrier phase, such as the above-mentioned NVP olefin copolymers, are used. These remain almost completely in the filtrate after the powder has been washed with the solvent used in the carrier phase.

The powder according to the invention is obtained in the form of spherical particles having diameters of about 10 to 500 μm. The particle size distribution is influenced by the nature and quantity of the surface active agent, the intensity of stirring and the temperature during the reaction. If the blowing agent used according to the invention is to be incorporated in the powder particles as described, it should have an average particle size substantially below that of the powder.

The quantity of blowing agent required for preparing the polyurethane powder composition containing blowing agent depends inter alia on the geometrical form, density and thickness of the molded products to be produced and the gas yield of the blowing agent. Preferably, from 0.1 to 10 parts by weight, most preferably from 0.5 to 5 parts by weight based upon 100 parts of powder of at least one pulverulent blowing agent which is solid at least at room temperature (25° C.) is used.

Additives, such as finely divided solids, e.g. talc or vapor phase silicas, for improving the flow properties of the powder or melt, may either be added at any stage before filtration or subsequently mixed with the powder according to the invention. This also applies to other additives, e.g. organic dyes (such as ultramarine or phthalocyanine) or inorganic pigments, titanium dioxide or carbon black. antioxidants, UV-stabilizers, flow improvers, and the like. In a preferred embodiment of the present invention, the additives are added to one of the starting materials which are in the liquid or molten state, preferably to component IA or IB or one of the starting materials thereof.

The polyurethane powder preparation containing blowing agent may be used for producing foamed (cellular) polyurethane moldings. For this purpose, it is melted by heating to a temperature above the decomposition temperature of the blowing agent. The procedure described in German Auslegeschrift 4,006,648, for example, may be employed. For example, the polyurethane powder preparation containing blowing agent may be applied in a sufficient quantity to the surface of a mold which has been tempered at 150° to 280° C., preferably from 150° to 220° C., to form a cellular molding of the required thickness, and the excess polyurethane powder preparation containing blowing agent may then be removed after a brief contact, e.g. of 10 to 30 seconds. Sintering with foaming up of the powder layer adhering to the surface of the mold is then brought about by the thermal capacity of the mold or by reheating. The mold is left to cool after 0.5 to 10 minutes (e.g. air stream or water bath) and the foamed polyurethane product obtained is removed from the mold.

The polyurethane powder preparation containing blowing agent may also be processed in a closable, tempered mold to produce foamed polyurethane moldings, for example by introducing into the cavity of the open mold, which is maintained at 150° to 280° C., preferably at 150° to 220° C., a sufficient quantity of the polyurethane powder preparation with blowing agent to enable it to fill the mold when foamed up. The mold is then closed and reheated for 0.5 to 30 minutes, preferably 0.5 to 15 minutes, so that the polyurethane powder preparation containing blowing agent melts and foams up to fill the mold, care being taken to ensure that gases and excess quantities of foam can escape. When the mold has cooled, the foamed polyurethane molding produced is removed.

The possibilities of producing special effects (surface structure, coatings, and the like) described in German Auslegungsschrift 4,006,648 may be applied to the polyurethane powder preparations containing blowing agent and the molded products produced from them.

It is particularly advantageous to use the PU powders according to the invention for producing foam moldings having a dense outer skin by first producing the outer skin from the PU powders according to the invention by the slush molding process and then back foaming this skin with the same powder containing blowing agent. The cross-linking of the outer skin which takes place during the process is particularly advantageous because the cross-linked outer skin is unable to slip from its position during back foaming. In fact, the subsequent step of back foaming which is accompanied by further heating increases the degree of cross-linking.

The foamed moldings produced with the polyurethane powder preparation containing blowing agent are preferably sheet products having thicknesses of up to 5 cm and a total density of about 0.1 to 1 g/cm$^3$, preferably from 0.15 to 0.5 g/cm$^3$. The density may be further increased by means of fillers. The texture of the products obtained may be adjusted from brittle-rigid to tough-rigid or from flexible to elastic-flexible by correct choice of the polyurethane raw materials used. It was found particularly advantageous to be able to use component III according to the invention for modifying the mechanical properties such as the ultimate tensile strength, the elasticity or the density. Further changes in the properties may be obtained by the incorporation of reinforcing fillers such as glass fibers in the polyurethane powder preparation containing blowing agent.

The foamed moldings produced with the polyurethane powder preparation containing blowing agent may be used in the engine compartment and interior of motor vehicles, e.g. as sound insulation in the engine compartment, for facing columns or doors, car roofs, arm rests or instrument panels. They are also suitable, for example, for the manufacture of furniture, e.g. upholstered furniture, synthetic leather, inner shoes or handbags. They may also be used as covering or interlayers or insoles for the production of shoe soles.

The percentages and parts given in the present description denote percentages by weight and parts by weight unless otherwise indicated.

EXAMPLES

The following starting materials are used in the following examples:
Polyester I = a polyester polyol from adipic acid and hexane diol, having an OH number of 48.
Polyester II = polyester polyol based on adipic acid, hexanediol and neopentyl glycol with an average hydroxyl number of 56.
Pigmented Polyester = Polyester II into which a mixture of 97 parts titanium dioxide powder and 3 parts carbon black (25 parts pigment to 100 parts mixture) has been worked in a heated (90° C.) mill with stationary corundum disc and rotor (the mill is commercially obtainable from Fryma Maschinen AG, Rheinfelden (the OH number of the pigmented polyester was 42).
Polyether = polypropylene glycol of 112 OH number.

Emulsifier = copolymer of 20 wt % N-vinylpyrrolidone and 80 wt % eicosene-1 (commercially available as Antaron V 220 from GAF).
Hydrolysis Preventive = Stabaxol I, a carbodiimide commercially obtainable (Bayer AG) under the designation Stabaxol I.
BHT = Commercially available stabilizer (butylated hydroxytoluene).
IPPD = a commercially available stabilizer (isopropyl-phenyl-phenylene diamine).
Blowing Agent = a commercially available azodicarbonamide having an average particle size of 5 μm and a decomposition temperature of about 200° C.

Example 1

(Comparative example, not according to the invention)

62.9 parts Polyester II and 8 parts Pigmented Polyester were heated to 100° C., mixed and, under vacuum, dehydrated and degassed. 0.2 parts hydrolysis preventive and 0.5 parts BHT were then added. The mixture was reacted at 80° C. with 20.5 parts 1,6-hexamethylene diisocyanate until the NCO value was constant (calculated 8% NCO).

A solution of 5 parts emulsifier and 2 parts dibutyltin dilaurate in 233 parts isooctane was heated to 90° C. The polyester-HDI prepolymer (92.1 parts) was introduced with powerful stirring over a period of about 10 min. The stirring was applied by a twin-propeller stirrer at 1100 rpm. After 30 minutes 1,4-butanediol was added (NCO/OH-Index=1.00, i.e. 7.9 parts butanediol at 8.0% NCO-value of prepolymer). The stirring was continued for about 2 hours at 90° C. until free isocyanate was no longer detectable. The heater was removed and the dispersion, after cooling to room temperature, filtered through a Büchner funnel. The filter residue was washed twice with 100 parts isooctane and then dried for 48 hours in vacuum at room temperature. The free-flowing grey powder obtained was sieved through sieves of different mesh sizes and had the properties indicated in Table 1.

A 1000μ thick film of the thermoplastic powder was applied with a doctor blade to a glass plate. After 20 minutes at 200° C., a homogeneous film was obtained. After cooling, the film obtained was removed and had the properties indicated in Table 2.

To test the fusing behavior during the slush molding process, a cast-iron mold (passenger car armrest) was heated to 200° C. The powder was then poured in and slewed round in the mold for about 1 minute and the mold then emptied again, apart from the adhering gelled powder. The mold was after-baked for 10 minutes at 200° C. in an oven. It was subsequently cooled with water and the skin removed carefully. With the powder of this example, the skin was irregular in thickness, and had holes and drip points. Moreover, a considerable part of the melt had flowed away during the after-baking process.

Example 2 a) Production of component III 800 parts of an isocyanurate of 1,6-hexamethylene diisocyanate (HDI trimer; % NCO=21.5) were reacted at 100° C. with 543.9 parts of p-hydroxybenzoic acid ethyl ester. After about 1 hour, 859 parts Polyester I were added and the mixture reacted until free isocyanate was no longer detectable. The product obtained solidifies below 50° C.

b) Production of the powder 60.2 parts Polyester II and 8 parts Pigmented Polyester were heated to 100° C., mixed and, under vacuum, dehydrated and degassed. 0.2 part hydrolysis preventive and 0.5 part BHT were then added. The mixture was reacted at 80° C. with 19.7 parts 1,6-hexamethylene diisocyanate until the NCO value was constant (calculated 8% NCO) (component IA). Then 3.6 parts of component III were added (calculated NCO-value of the resulting mixture: 7.7%).

A solution of 5 parts emulsifier and 2 parts dibutyltin dilaurate in 233 parts isooctane was heated to 90° C. The polyester-HDI prepolymer/component III mixture 92.2 parts was introduced with powerful stirring over a period of about 10 minutes. The stirring was provided by a twin-propeller stirrer at 1100 rpm. After 30 minutes, 1,4-butanediol (component IIA) was added=(-NCO/OH-Index=0.98, i.e., 7.8 parts butanediol at 7.7% NCO-value of the prepolymer/comp.III mixture). Stirring of the dispersion was continued for about 2 hours at 90° C. until free isocyanate was no longer detectable. The heater was removed and the dispersion, after cooling to room temperature, filtered through a Büchner funnel. The filter residue was washed twice with 100 parts isooctane and then dried for 48 hours in vacuum at room temperature. The free-flowing grey powder obtained was sieved through sieves of different mesh sizes and had the properties indicated in Table 1.

A 1000μ thick film of the thermoplastic powder was applied with a doctor blade to a glass plate. After 20 minutes at 200° C., a homogeneous film was obtained. After cooling, the film obtained was removed from the glass plate and had the properties indicated in Table 2.

To test the fusing behavior during the slush molding process, a cast-iron mold (passenger car armrest) was heated to 200° C. The powder was then poured in and slewed round in the mold for about 1 minute and the mold then emptied again, apart from the adhering gelled powder. The mold was after-baked for 10 minutes at 200° C. in the oven. It was subsequently cooled with water and the skin was carefully removed.

The skin obtained with the powder was uniformly thick, and had no defects (holes) or drip points. No material flowed away during the after-baking process.

Example 3 a) Production of component III 491 parts of a polyisocyanate (% NCO=21.4) obtained by dimerizing 1,6-hexamethylene diisocyanate (% NCO=21.4) and containing uretdione groups were reacted at 90° C. with 81.3 parts n-octanol until the % NCO value was constant (calculated: 13.9%). The product obtained was a liquid at room temperature.

b) Production of the powder 58.4 parts Polyester II and 8 parts Pigmented Polyester were heated to 100° C., mixed and, under vacuum, dehydrated and degassed, 0.2 part hydrolysis preventive and 0.5 part BHT were added. The mixture was reacted at 80° C. with 18.4 parts 1,6-hexamethylene diisocyanate (component IA). Then 6.2 parts of component III described above were added and the mixture was reacted until the NCO-value was constant (calculated 8% NCO).

A solution of 5 parts emulsifier and 2 parts dibutyltin dilaurate in 233 parts isooctane was heated to 90° C. The polyester-HDI prepolymer/component III mixture (91.7 parts) was introduced with powerful stirring over a period of aobut 10 minutes. The stirring was applied by a twin-propeller stirrer at 1100 rpm. After 30 minutes, 1,4-butanediol (component IIA) was added=(-NCO/OH-Index=0.96, i.e., 8.3 parts butanediol at 8.0% NCO-value of the comp. IA/III mixture). The dispersion was stirred for about a further 2 hours at 90° C. until free isocyanate was no longer detectable. The heater was removed and the dispersion, after cooling to room temperature, filtered through a Büchner funnel. The filter residue was washed twice with 100 parts isooctane and then dried for 48 hours in vacuum at room temperature. The free-flowing grey powder obtained was sieved through sieves of different mesh sizes and had the properties indicated in Table 1.

A 1000 μ thick film of thermoplastic powder was applied with a doctor blade to a glass plate. After 20 minutes at 200° C., a homogeneous film was obtained. After cooling, the film obtained was removed form the glass plate and had the properties indicated in Table 2.

To test the fusing behavior during the slush molding process, a cast-iron mold (passenger car armrest) was heated to 200° C. The powder was then poured in and slewed round in the mold for about 1 minute and the mold then emptied again, apart from the adhering gelled powder. The mold was after-baked for 10 minutes at 200° C. in an oven. It was subsequently cooled with water and the skin was carefully removed.

The skin obtained with the powder was uniformly thick, and had no defects (holes) or drip points. No material flowed away during the after-baking process.

Example 4

42.9 parts Polyester II and 8 parts Pigmented Polyester were heated to 100° C., mixed and, under vacuum, dehydrated and degassed. 0.2 part hydrolysis preventive and 0.5 part BHT were then added. The mixture was reacted at 80° C. with 31.5 parts 4,4'-methylenebis(-cyclohexyl isocyanate). Then 6.8 parts of the component III used in Example 3 were added and the mixture was reacted until the NCO value was constant (calculated 10% NCO).

A solution of 5 parts emulsifier and 2 parts dibutyltin dilaurate in 233 parts isooctane was heated to 90° C. The polyester prepolymer/component III mixture (89.9 parts) was introduced with powerful stirring over a period of about 10 minutes. The stirring was applied by a twin-propeller stirrer at 1100 rpm. After 30 minutes, 1,4-butanediol was added=(NCO/OH-Index=0.96, i.e., 10.11 parts butanediol at 10% NCO-value of the prepolymer/comp. III-mixture). The dispersion is stirred for about a further 2 hours at 90° C. until free isocyanate was no longer detectable. The heater was removed and the dispersion, after cooling to room temperature, filtered through a Büchner funnel. The filter residue was washed twice with 100 parts isooctane and then dried for 48 hours in vacuum at room temperature. The free-flowing grey powder obtained was sieved through sieves of different mesh sizes and had the properties indicated in Table 1.

A 1000 μ thick film of the thermoplastic powder was applied with a doctor blade to a glass plate. After 20 minutes at 200° C., a homogeneous film was obtained. After cooling, the film obtained was removed from the glass plate and had the properties indicated in Table 2.

To test the fusing behavior during the slush molding process, a cast-iron mold (passenger car armrest) was heated to 200° C. The powder was the poured in and slewed round in the mold for about 1 minute and the mold then emptied again, apart from the adhering gelled powder. The mold was after-baked for 10 minutes at 200° C. in an oven. It was subsequently cooled with water and the skin was carefully removed.

The skin obtained with the powder was uniformly thick, and had no defects (holes) or drip points. No material flowed away during the after-baking process.

TABLE 1

| Physical properties of the powders | | | | |
|---|---|---|---|---|
| | Example | | | |
| Diameter of the powder particles | 1 | 2 | 3 | 4 |
| % less than 100μ | 5.4 | 3.0 | 1.0 | 6 |
| % between 100 and 200μ | 70.2 | 22.7 | 70.0 | 92.9 |
| % between 200 and 315μ | 22.9 | 72.7 | 26.8 | 1 |
| % between 315 and 800μ | 1.0 | 1.2 | 0.6 | 0.1 |
| % greater than 800μ | 0.6 | 0.4 | 1.7 | 0 |
| Melting point [°C.] | 160 | 170 | 164 | 120 |
| Adhesion point [°C.] | 140 | 150 | 144 | 95 |

At the adhesion point the particles start to stick together

TABLE 2

| Physical properties of the films | | | | |
|---|---|---|---|---|
| | Example | | | |
| | 1 | 2 | 3 | 4 |
| Tensile strength at break [MPa] | 27 | 32 | 20 | 22 |
| Elongation at break [%] | 751 | 634 | 565 | 380 |
| Tear propagation strength [N/cm] | 584 | 821 | 490 | 440 |
| Softening point [°C.] | 160 | 178 | 192 | 190 |

Example 5 a) Preparation of component III 800 parts of an isocyanurate of 1,6-hexamethylene diisocyanate (HDI trimer; NCO=21.5) are reacted with 543.9 parts of p-hydroxybenzoic acid ethyl ester at 100° C. 859 parts of Polyether I are added after about 1 hour and the mixture is reacted until no more free isocyanate can be detected. The product obtained solidifies below 50° C.

b) Preparation of the powder 68.7 parts of Polyester I are heated to 100° C., mixed and dehydrated under vacuum and degassified. 0.2 parts of hydrolysis protective agent and 0.5 parts of BHT are added. The mixture is reacted with 19.1 parts of 1,6-hexamethylene diisocyanate at 80° C. until the NCO value is constant (calculated 8% NCO). 3.6 parts of the cross-linking component described under a) (component III) are then added. The resulting mixture has a calculated NCO value of 7.7%.

A solution of 5 parts of emulsifier and 2 parts of dibutyl tin dilaurate in 233 parts of isooctane is heated to 90° C.=the polyester-HDI prepolymer/com.III-mixture (92.1 parts) is introduced with vigorous stirring over a period of about 10 minutes, using a double propeller stirrer at 1100 revs/min. 1,4-butanediol is added after 30 minutes=(NCO/OH Index=1.0, i.e. 7.7 parts of 1,4-butanediol at 7.7% NCO-value of the prepolymer/-comp.III mixture). Stirring of the dispersion is continued for about 2 hours at 90° C. until no more free isocyanate can be detected. The heating means are removed and 3 parts of Blowing Agent are added to the resulting sedimenting suspension with stirring after it has cooled to room temperature. The mixture containing blowing agent is then filtered through a Büchner funnel. The filter residue is washed twice with 100 parts of isooctane and then dried in a vacuum for 48 hours at room temperature. A free-flowing powder having a melting point of about 170° C. is obtained. More than 99% by weight of the particles have particle sizes below 315 μm.

To produce a foamed sheet product, a sufficient quantity of the polyurethane powder preparation containing blowing agent (layer thickness about 3.5 mm) is applied by a coating knife to a metal plate and the plate is tempered in an oven for 15 minutes at 200° C. The powder mixture first melts and then begins to foam up with decomposition of the blowing agent. The product obtained after it has cooled and been removed from the plate is a semi-rigid elastic foamed plate having a thickness of 10 mm and a density of 0.16 g/cm$^3$.

Example 6 a) Preparation of component III 491 parts of a polyisocyanate containing uretdione groups NCO=21.4) obtained by the dimerization of 1,6-hexamethylene diisocyanate are reacted with 81.3 parts of n-octanol at 90° C. until the NCO value is constant (calculated 13.9%). The product obtained is liquid at room temperature.

b) Preparation of the powder 58.4 parts of Polyester II and 8 parts of Pigmented Polyester are heated to 100° C., mixed and dewatered in a vacuum and degassified. 0.2 parts of hydrolysis protective agent and 0.5 parts of BHT are added. The mixture is reacted with 18.4 parts of 1,6-hexamethylene diisocyanate at 80° C. (component IA). 6.2 parts of component III described under a) are then added. The mixture is reacted until the NCO value is constant (calc.8% NCO). 1.5 parts of Blowing Agent are finally added to the prepolymer melt with stirring and the mixture continues to be stirred for about 10 minutes.

A solution of 5 parts of emulsifier and 2 parts of dibutyl tin dilaurate in 233 parts of isooctane is heated to 90° C. The comp.IA/com.III-mixture (91.7 parts) is introduced with vigorous stirring overa period of about 10 minutes, using a double propeller stirrer at 1100 revs/minute. 1,4-butanediol is added after 30 minutes=(-NCO/OH-Index=0.96, i.e. 8.3 parts of butanediol at 8% NCO value of the component IA/III-mixture). Stirring of the dispersion is continued for about 2 hours at 90° C. until no more free isocyanate can be detected. The heating means are removed and the dispersion is filtered through a Büchner funnel after it has cooled to room temperature. The filter residue is washed twice with 100 parts of isooctane and then dried in a vacuum at room temperature for 48 hours. The free-flowing grey powder obtained contains the blowing agent in the powder particles and melts at temperatures above 160° C. More than 99% of the particles have a particle size of less than 315 μm.

To produce a foamed sheet product, a sufficient quantity of the polyurethane powder preparation containing blowing agent (layer thickness about 3 mm) is applied by a coating knife to a metal plate which has been preheated to about 180° C., and the excess of mixture which has not sintered is removed. The mixture is tempered in an oven at 200° C. for 10 minutes. During this time, the powder mixture first melts and then begins to foam up with decomposition of the blowing agent. The product obtained after cooling and removal from the plate is a flexible, elastic foamed plate which has a thickness of 8 mm and a density of 0.2 g/cm$^3$.

Example 7

A back-foamed polyurethane film, e.g. for the interior parts of a motor vehicle, is produced by first using a polyurethane powder preparation prepared as described in Example 3 for manufacturing the compact covering layer.

A metal mold is preheated to about 200° C. The powder is gelled to a compact layer without the addition of blowing agent by contact with the surface of the mold and after tempering at 200° C. for 5 minutes. The polyurethane powder preparation of Example 6 containing blowing agent is then applied to the side of this layer facing away from the mold while the layer is still inside the mold, and the polyurethane powder preparation is gelled. The excess which has not melted is removed by rotating the mold. The mold is again after-tempered at 200° C. for 10 minutes. When the mold has cooled, the foamed molded part which has a compact surface can be removed from the mold.

Example 8

A foamed molding with compacted surface, e.g. a shoe sole, may be produced in a suitable mold consisting, for example, of a detachable upper and lower part. The upper and the lower part are tempered separately to about 200° C. The polyurethane powder preparation according to the invention containing blowing agent is introduced into the lower part in a quantity which is determined by the desired average foam density and the volume to be obtained after foaming, e.g. about 70 g of powder mixture for a volume of 240 cm$^3$ and the desired density of 0.3 g/cm$^3$. The mold is closed by applying the upper part and is after-temperatured at 200° C. for about 15 minutes. After cooling, the foamed shoe sole obtained, which has a compacted surface, may be removed.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for production of free-flowing polyurethane powders comprising:
   a) producing a non-aqueous emulsion of fine droplets of a first component, stabilized by a surface-active compound, wherein said first component is selected from the group consisting of IA) a component having free NCO groups and IB) a component IB having groups reactive towards NCO groups,
   b) reacting said emulsion with a second component reactive with said first component, said second component selected from the group consisting of IIA) a component having an average of two hydrogen atoms reactive towards NCO groups per molecule and IIB) a component having an average of two NCO groups per molecule, with the proviso that if the emulsion of step a) is based upon component IA), then said second component is IIA) and if the emulsion of step a) is based upon component IB), then said second component is IIB), wherein step b) is conducted in the presence of a separately produced component III that contains at least partially blocked isocyanate groups, and in the presence of an inert organic liquid carrier phase in which the components IA or IB and the respective reaction product are insoluble, and
   c) separating the reaction product from said inert organic carrier.

2. The process of claim 1 wherein a blowing agent which is insoluble in the carrier phase is used and is added to the inert organic liquid carrier phase.

3. The process of claim 2, wherein the blowing agent is added to a component IA, IIA, IB or IIB before the reaction of said components.

* * * * *